United States Patent [19]

Perez et al.

[11] Patent Number: 5,326,478
[45] Date of Patent: Jul. 5, 1994

[54] METHODS FOR CONTROLLING SCALE FORMATION IN AQUEOUS SYSTEMS

[75] Inventors: Libardo A. Perez, Morrisville; Donald T. Freese, Glenside; Judith B. Rockett, Perkasie; William S. Carey, Ridley Park, all of Pa.

[73] Assignee: Betz Laboratories, Inc., Trevose, Pa.

[21] Appl. No.: 99,674

[22] Filed: Jul. 29, 1993

[51] Int. Cl.$^5$ ................................................ C02F 5/10
[52] U.S. Cl. ..................................... 210/698; 252/180
[58] Field of Search ............................... 210/698–701; 252/180, 181

[56] References Cited

U.S. PATENT DOCUMENTS 5,062,962  11/1991  Brown et al. .................. 210/698
5,147,555   9/1992  Brown et al. .................. 210/698

Primary Examiner—Peter A. Hruskoci
Attorney, Agent, or Firm—Alexander D. Ricci; Steven D. Boyd

[57] ABSTRACT

A method of controlling the formation and deposition of scale forming salts in a circulating aqueous system is described wherein a treatment solution of a substoichiometric amount of polyepoxysuccinic acid in combination with agaric acid is employed.

2 Claims, No Drawings

METHODS FOR CONTROLLING SCALE FORMATION IN AQUEOUS SYSTEMS

FIELD OF THE INVENTION

The present invention relates to the treatment of water to inhibit the formation of scale. More particularly, the present invention relates to a treatment for circulating aqueous systems which comprises a polyepoxysuccinic acid in combination with agaric acid.

BACKGROUND OF THE INVENTION

Although the present invention has general applicability to any given system where the formation and deposition of scale and in particular calcium scale is a potential problem, the invention will be discussed in detail as it concerns circulating cooling water systems. The present invention relates to methods for inhibiting scale deposits and fouling in circulating aqueous systems.

In industrial cooling systems, water such as from rivers, lakes, ponds, etc., is employed as the cooling media for heat exchangers. Such natural waters contain large amounts of suspended material such as silt, clay and organic wastes. The cooling water circulating through a heat exchanger is typically circulated through a cooling tower, spray pond or evaporative system prior to discharge or reuse. In such systems, cooling is achieved by evaporating a portion of the water passing through the system. Because of the evaporation which takes place during cooling, suspended materials in the water become concentrated. Fouling materials from the feedwater or as a result of the evaporative concentration can settle in locations of low flow rates and cause corrosion and inefficient heat transfer. Agglomerating agents such as polyacrylamides and polyacrylates have been used to agglomerate fine particles of mud and silt into a loose floc for removal. However, these flocs tend to settle in cooling tower basins and frequent cleaning is necessary to remove the settled flocs from the tower basins.

The water employed in industrial cooling water systems also often contains dissolved salts of calcium, magnesium, etc., which can lead to scale and sludge deposits. One of the most common scale deposits in circulating aqueous cooling systems is calcium carbonate. It normally results from the breakdown of calcium bicarbonate, a naturally occurring soluble salt. Calcium carbonate has a relatively low solubility and its solubility decreases with increasing temperature and pH. Thus, the rate of calcium carbonate deposition increases with increasing pH and temperature.

Deposit control agents such as phosphates, phosphonates and polyacrylates are often used to inhibit calcium carbonate scale formation in industrial cooling water systems. The use of polyacrylates alone is not effective at high calcium concentrations because undesirable polyacrylate-calcium adducts are formed reducing efficacy. Although phosphonates are very efficient at controlling calcium carbonate scale formation, they can produce insoluble phosphonate-calcium complexes or calcium phosphate scale upon degradation. Further, current limits on phosphate discharge limit the acceptability of the use of phosphonates for water treatments.

Preventing the corrosion and scaling of industrial heat transfer equipment is essential to the efficient and economical operation of a cooling water system. Excessive corrosion of metallic surfaces can cause the premature failure of process equipment requiring down time for the replacement or repair of the equipment. Additionally, the buildup of corrosion products on heat transfer surfaces impedes water flow and reduces heat transfer efficiency thereby limiting production or requiring down time for cleaning. Reductions in efficiency will also result from scaling deposits which retard heat transfer and hinder water flow.

Scale can also cause rapid localized corrosion and subsequent penetration of metallic surfaces through the formation of a differential oxygen concentration cells. The localized corrosion resulting from differential oxygen cells originating from deposits is commonly referred to as "under deposit corrosion". The treatment of industrial waters to inhibit scale formation with polyepoxysuccinic acid (hereinafter PESA) is disclosed in U.S. Pat. No. 5,062,962 incorporated herein by reference. The general formula for PESA is:

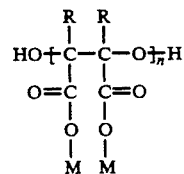

wherein n ranges from about 2 to 50, preferably, 2 to 25, M is hydrogen or a water soluble cation such as $Na^+$, $NH_4^+$ or $K^+$ and R is hydrogen, C1-C4 alkyl or C1-C4 substituted alkyl (preferably R is hydrogen). PESA is known to be an effective inhibitor for scale control. However, it was found that when the PESA was employed in some systems that contained a variety of materials, both metal and plastic, and where the water was circulating, there was a slight decrease in efficacy of the scale inhibiting and deposit control properties of PESA.

SUMMARY OF THE INVENTION

The present invention provides an effective composition and method for inhibiting scale formation and deposition in circulating aqueous systems by employing PESA in combination with agaric acid. The combination of the present invention provides for enhanced scale inhibiting and deposit control properties of PESA in circulating water systems. The combination of the present invention provides for scale formation inhibition and deposit control in circulating aqueous systems which is effective at conditions of high pH, high calcium concentration and high M-alkalinity where conventional calcium control treatments lose efficacy. The present invention controls calcium scale formation and the fouling of heat transfer surfaces but does not employ phosphorus thereby eliminating the undesirable discharge of phosphorus containing compounds. The present invention is effective at treating circulating waters having low levels of calcium as well as those having high calcium levels.

The present invention is effective at inhibiting the formation and deposition of scale forming materials such as calcium oxalate, calcium sulfate, barium sulfate as well as the more common calcium carbonate. The present invention is effective at controlling scale deposition on metal surfaces such as Admiralty brass as well as plastics such as polyvinyl chloride and poly(methylmethacrylate) type polymers. The present invention is effective at inhibiting calcium carbonate at high pH as would be required in paper mills.

The method of the present invention comprises treating circulating industrial water with a combination of a polyepoxysuccinic acid of the general formula:

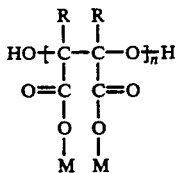

wherein n ranges from about 2 to 50, preferably 2 to 25, and M is hydrogen or in water soluble cation such as $Na^+$, $NH_4^+$ or $K^+$ and R is hydrogen, C1-C4 alkyl or C1-C4 substituted alkyl (preferably R as hydrogen); and Agaric Acid.

In the present invention, the combination is added to circulating aqueous systems at substoichiometric levels to inhibit scale formation and deposition.

DESCRIPTION OF THE PREFERRED EMBODIMENTS

The present invention relates to a novel composition and method of inhibiting the formation and deposition of scale such as calcium scale from circulating aqueous systems. Specifically, the present invention comprises adding to a circulating aqueous system a treatment solution comprising a combination of a polyepoxysuccinic acid of the general formula:

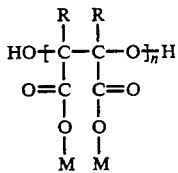

wherein n ranges from about 2 to 50, preferably 2 to 25, M is hydrogen or a water soluble cation such as $Na^+$, $NH_4^+$ or $K^+$ and R is hydrogen, C1-C4 alkyl or C1-C4 substitute alkyl (preferably R is hydrogen); and agaric acid or compounds having similar structure and functionalities.

Polyepoxysuccinic acids are known to provide calcium scale inhibition comparable to prior art phosphates, phosphonates and polyacrylates without the recognized limitations of the prior art treatments. Polyepoxysuccinic acids are effective in most water systems, and particularly effective in aqueous systems having high Langelier Saturation Index (LSI) numbers. U.S. Pat. No. 5,062,962 (incorporated herein by reference) outlines a method of preparing a polyepoxysuccinic acid material useful in the present invention.

In the testing of the scale control properties of polyepoxysuccinic acid the test method measured surface deposition or surface fouling in a dynamic or circulating system. The inventors of the present invention discovered that the efficacy of polyepoxysuccinic acid at controlling the surface deposition in circulating systems was enhanced by the addition of Agaric acid. Agaric acid, 2-hydroxy-1,2,3, nonadecane tricarboxylic acid, is also called Agaricic Acid.

The treatment levels of polyepoxysuccinic acid added to the circulating aqueous system can range from 25 parts per billion to about 500 parts per million. The preferred treatment levels range from about 5 parts per million up to about 100 parts per million. The concentration of polyepoxysuccinic acid necessary to provide effective scale control will vary from system to system. The treatment will vary, in part, with changes in temperature, pH and calcium concentration. However, in all cases, the concentration of polyepoxysuccinic acid added to a circulating aqueous system in accordance with the present invention is at substoichiometric concentrations. That is, the concentration of polyepoxysuccinic acid added is much lower than the concentration of the scale forming material in the system to be treated.

The treatment levels of Agaric acid added to the system can range from about 20 parts per billion up to about 50 parts per million. The preferred treatment level ranges from about 0.1 parts per million up to about 10 parts per million. The ratio of polyepoxysuccinic acid to agaric acid can range from about 100 to 1 to about 1 to 1.

The present invention will now be described with reference to a number of specific examples which are to be regarded solely as illustrative and not as restricting the scope of the present invention.

EXAMPLES

Example 1

Dynamic beaker calcium carbonate inhibition testing of polyepoxysuccinic acid and polyepoxysuccinic acid/agaric acid blends at varying treatment levels were undertaken. The polyepoxysuccinic acid employed in the testing was prepared as described in U.S. Pat. No. 5,062,962. The testing involved adding the treatment to a solution containing calcium and carbonate ions and having a pH of 8.7 at 56° C. Coupons of the materials to be tested were suspended in the solution. The beakers were incubated in a shaking water bath for 66 hours at 56° C. After cooling, a measured portion was filtered, and the pH adjusted to less than 2.0 with hydrochloric acid. The mixture was diluted and the pH adjusted to 12 with sodium hydroxide. A calcium indicator, Murexide, was added and the solution titrated to a pure violet endpoint with ethylenediamine tetraacetic acid. Percent inhibition was calculated from titrations of the treated, stock and control solutions. Deposition on the suspended non-heat transfer surfaces was evaluated by visual inspection. The conditions of the tests were: 600 ppm Ca as $CaCO_3$; 300 ppm Mg as $CaCO_3$; 400 ppm Malk as $CaCO_3$; 288 ppm $SO_4$; 425 ppm Cl; 185 ppm Ma; pH 8.7 at 56° C.; 3 ppm tolyltriazole.

Table 1 summarizes the results of the tests and shows that the combination of the present invention improves the deposit rating for all of the materials tested.

TABLE 1

| Treatment | % Inhibition | Coupon Material | Deposition* Rating |
|---|---|---|---|
| Control | — | Admiralty | 4 |
| 10 ppm PESA | 54.0 | Admiralty | 2 |
| 20 ppm PESA | 83.0 | Admiralty | 2 |
| 2 ppm Agaric acid | 3.0 | Admiralty | 3 |
| 10 ppm PESA + 2 ppm agaric acid | 65.5 | Admiralty | 2 |
| 20 ppm PESA + 2 ppm agaric acid | 80.0 | Admiralty | 1 |
| 20 ppm PESA + 1 ppm agaric acid | 80.5 | Admiralty | 1 |
| 20 ppm PESA | 81.0 | Admiralty | 2 |
| 20 ppm PESA + 0.2 ppm agaric acid | 78.0 | Admiralty | 1 |
| 20 ppm PESA + 0.4 ppm agaric acid | 78.0 | Admiralty | 1 |
| 20 ppm PESA + 0.8 ppm agaric acid | 78.0 | Admiralty | 1 |

TABLE 1-continued

| Treatment | % Inhibition | Coupon Material | Deposition* Rating |
|---|---|---|---|
| Control | — | Plexiglas ® | 4 |
| 10 ppm PESA | 63.3 | Plexiglas ® | 3 |
| 20 ppm PESA | 83.0 | Plexiglas ® | 4 |
| 10 ppm PESA + 2 ppm agaric acid | 66.5 | Plexiglas ® | 2 |
| 20 ppm PESA + 2 ppm agaric acid | 80.0 | Plexiglas ® | 1 |
| 20 ppm PESA + 1 ppm agaric acid | 95.0 | Plexiglas ® | 1 |
| 20 ppm PESA | 81.0 | PVC | 2 |
| 20 ppm PESA + 0.2 ppm agaric acid | 78.0 | PVC | 2 |
| 20 ppm PESA + 0.4 ppm agaric acid | 76.0 | PVC | 1 |
| 20 ppm PESA + 0.8 ppm agaric acid | 78.0 | PVC | 1 |

*1 = clean
2 = very slight deposit
3 = slight deposit
4 = moderate deposit
Plexiglas ® is a trademark of Rohm & Haas Co.

Example 2

Testing was conducted in a bench top unit (BTU) which simulates a circulating cooling water system. The BTU units are designed to provide a measure of the ability of the treatment to prevent corrosion and scale formation under heat transfer conditions. The treated water is circulated through a corrosion coupon by-pass rack, into which corrosion coupons are inserted and passes through a heat exchanger tube contained in a Plexiglas ® block (trademark of Rohm & Haas Company). The heat exchanger is fitted with an electrical heater so that the heat load on the exchanger tube can be varied and controlled in the 0 to 16,000 BTU/ft$^2$/hr range. The water velocity passing the unit can be controlled in the 0 to 4.5 ft/sec. range. A section of PVC tower fill is immersed in the sump of the unit.

The pH and temperature of the circulating water are automatically controlled. The treated water was prepared by the addition of the component ions to deionized water. Provisions for continuous makeup and blowdown are made by pumping fresh treated water from supply tanks to the sump of the unit, with overflow from the sump serving as blowdown. The system volume is approximately 12 liters. Table 2 summarizes testing in these bench top units for a variety of materials. The test conditions were: 600 ppm Ca as CaCO$_3$; 300 ppm Mg as CaCO$_3$; 400 ppm Malk as CaCO$_3$; 288 ppm SO$_4$; 425 ppm Cl; 187 ppm Na; 3 ppm tolyltriazole; pH 8.8; bulk temperature 49° C.; skin temperature 57°; flow rate 2.8 feed/second; heat input 13,000 BTU/ft$^2$/hr.

Table 2 summarizes the results of the bench top unit testing and shows that the combination of the present invention enhances the deposit control activity of polyepoxysuccinic acid in circulating systems.

TABLE 2

Dynamic CaCO$_3$ Inhibition

| Treatment | ppm | Tube* Depos. Rating | Plexiglas* Block Rating | PVC* Twr. Fill Depos. Rating | Coup* Depos. Rating | Corr. Rate mpy | Duration | Turbidity |
|---|---|---|---|---|---|---|---|---|
| PESA | 20 | 4 | 4 | 4 | 4 | 0.1 | 7 | 5.86 |
| PESA | 20 | 2** | 1 | 1 | 1 | 0.2 | 14 | 2.32 |
| Agaric Acid | 2 | | | | | | | |
| PESA | 20 | 2 | 1 | 1 | No | 0.35 | 7 | 0.87 |
| Agaric Acid | 2 | | | | | | | |
| PESA | 20 | 1 | 1 | 1 | 1 | 0.2 | 7 | 0.50 |
| Agaric Acid | | | | | | | | |
| PESA | 20 | 1 | 1 | 1 | 1 | 0.35 | 4 | 0.41 |
| Agaric Acid | 0.5 | | | | | | | |
| PESA | 20 | 2*** | 3 | 1 | 1 | 1.25 | 7 | 0.49 |
| Agaric Acid | 0.2 | | | | | | | |

*1 = clean
2 = very slight deposit
3 = slight deposit
4 = moderate deposit
**deposit consisted of agaric acid
***deposit consisted of calcium carbonate While the present invention has been described with respect to particular embodiments thereof, it is apparent that numerous other forms and modifications of the invention will be obvious to those skilled in the art. The appended claims and this invention generally should be construed to cover all such obvious forms and modification which are within the true scope and spirit of the present invention.

We claim:

1. A method of controlling the formation and deposition of scale forming salts in a circulating aqueous system comprising adding into said aqueous system a substoichiometric amount sufficient for the purpose of a treatment solution comprising a polyepoxysuccinic acid in combination with agaric acid, wherein said treatment solution has a ratio of polyepoxysuccinic acid to agaric acid of from about 100 to 1 to about 1 to 1.

2. The method of claim 1 wherein said polyepoxysuccinic acid is added to the aqueous system at active treatment levels ranging from about 25 parts per billion to about 100 parts per million and said agaric acid is added to the aqueous system at active treatment levels ranging from about 20 parts per billion up to about 10 parts per million.

* * * * *